Sept. 7, 1937. S. WILSON 2,092,102

DISINTEGRATER FOR COMPOST AND THE LIKE

Filed July 25, 1935 3 Sheets-Sheet 1

Inventor
Scott Wilson
By Clarence A. O'Brien
Attorney

Inventor
Scott Wilson
By Clarence A O'Brien
Attorney

UNITED STATES PATENT OFFICE 2,092,102

DISINTEGRATER FOR COMPOST AND THE LIKE

Scott Wilson, Rising Sun, Md.

Application July 25, 1935, Serial No. 33,131

2 Claims. (Cl. 83—11)

This invention is a machine for screening and piling dirt, and also for gathering, beating and piling compost or manure.

The invention together with its objects and advantages will be best understood from a study of the following description taken in connection with the accompanying drawings wherein.

Figure 1:
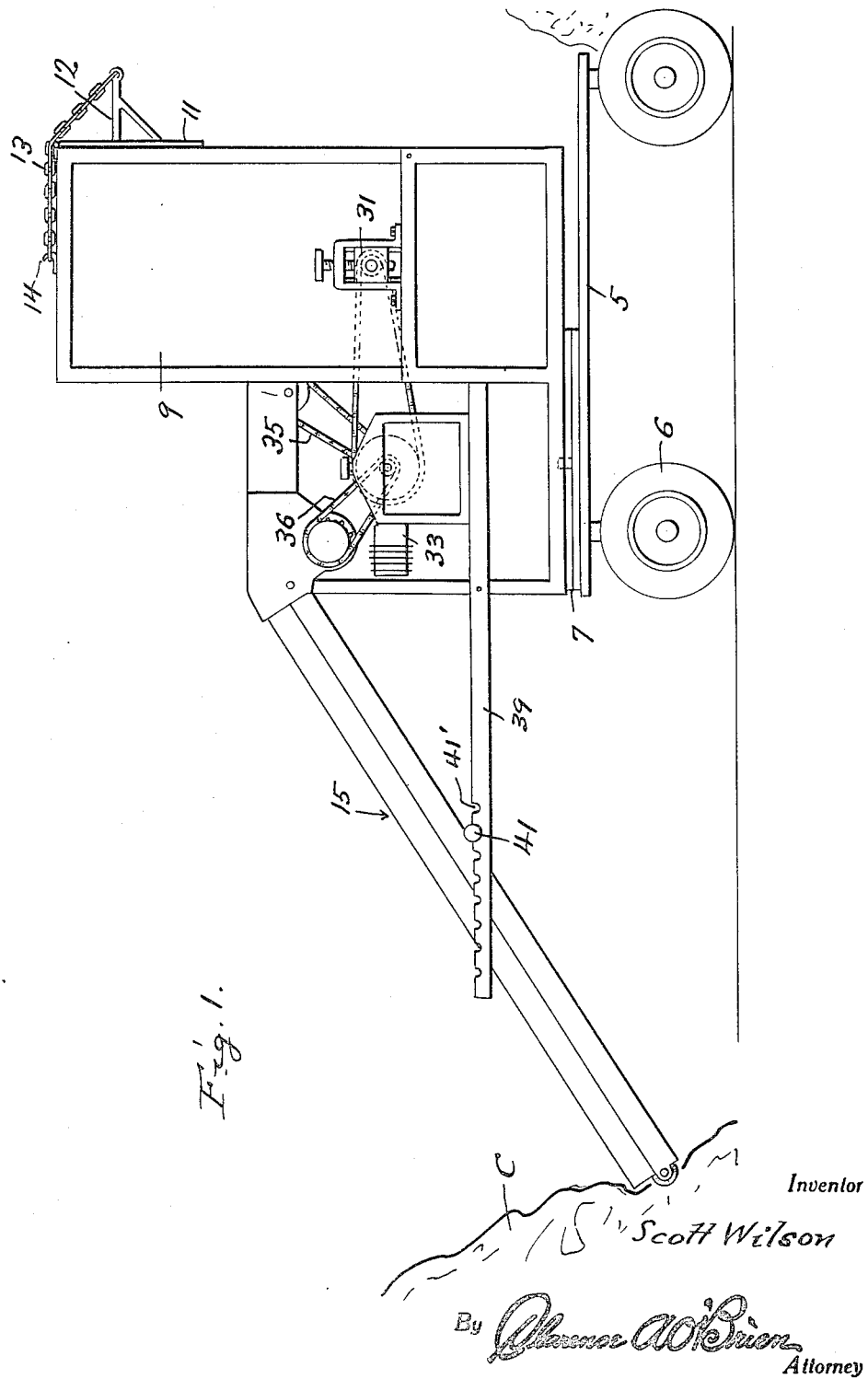
Figure 1 is a side elevational view of the machine.

Referring to the drawings by reference numerals it will be seen that the machine comprises a truck 5 equipped with wheels 6. Mounted on the truck 5 at one end is a turn table 7 to which is secured a frame structure 8. Suitably mounted on this frame structure 8 is a housing 9 provided at one side with horizontally swinging doors 10 and an upper vertically swinging door 11. For holding the door 11 in the open position shown in Figure 2 there is on the door a suitable bracket 12 in which is connected one end of a flexible element, for example a length of chain 13. The chain 13 is adapted to engage with a suitable hook support provided on the top of the housing 9 as shown.

Figure 2:
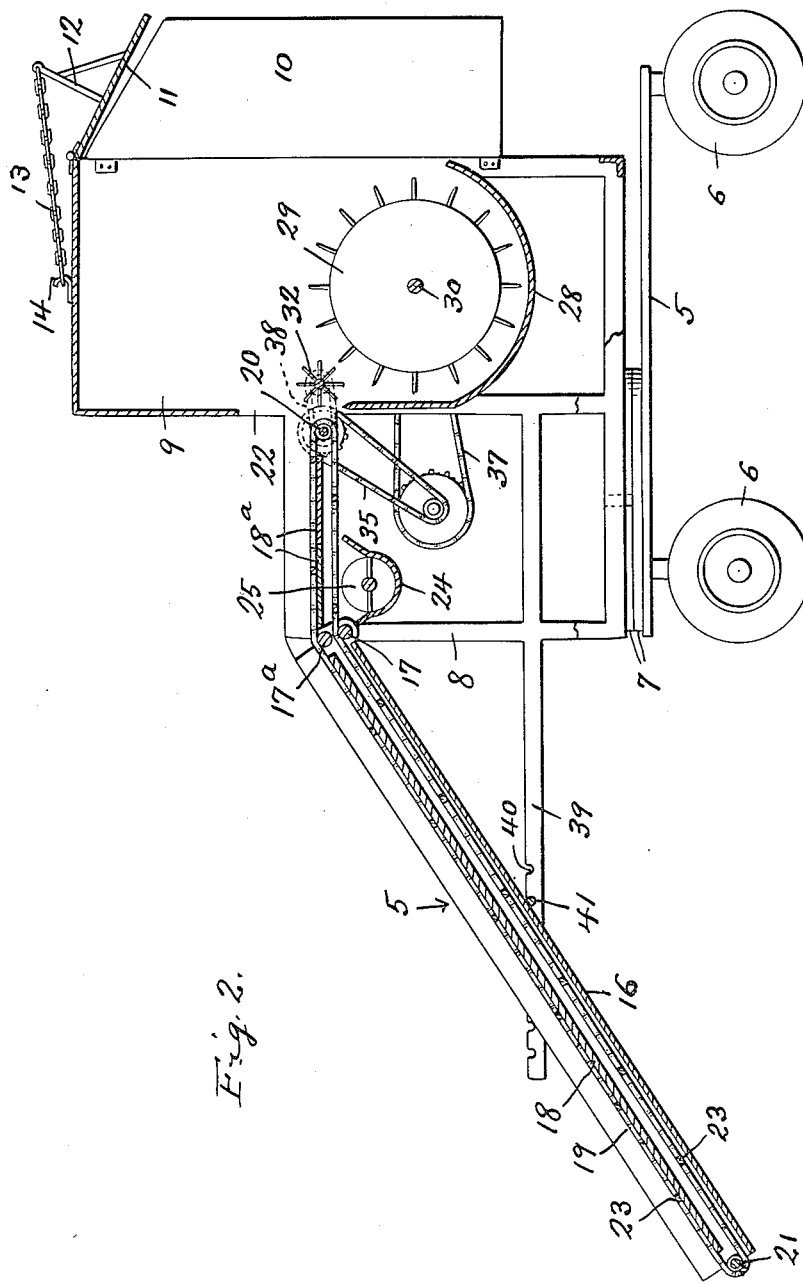
Figure 2 is a sectional view through the machine.

An endless conveyor 15 comprising a trough 16 formed with a bottom and side walls is hinged to the upper portion of the frame 8 as at 17. Arranged in the trough 16 is a false bottom or apron 18 about which are trained endless chains 19 that are also trained over suitable sprockets provided on the ends of shafts 20 and 21, shaft 21 being located adjacent the free end of the trough 16, and shaft 20 being located in proximity to an inlet opening 22 provided in what may be termed the front wall of the housing 9 as shown in Figure 2. These chains are also trained over the aforementioned pivot rod 17 and an additional guide rod or shaft 17a.

At intervals the chains 19 are connected together by slats 22 which moving over the apron 18 serve to convey the material upwardly.

Figure 3:
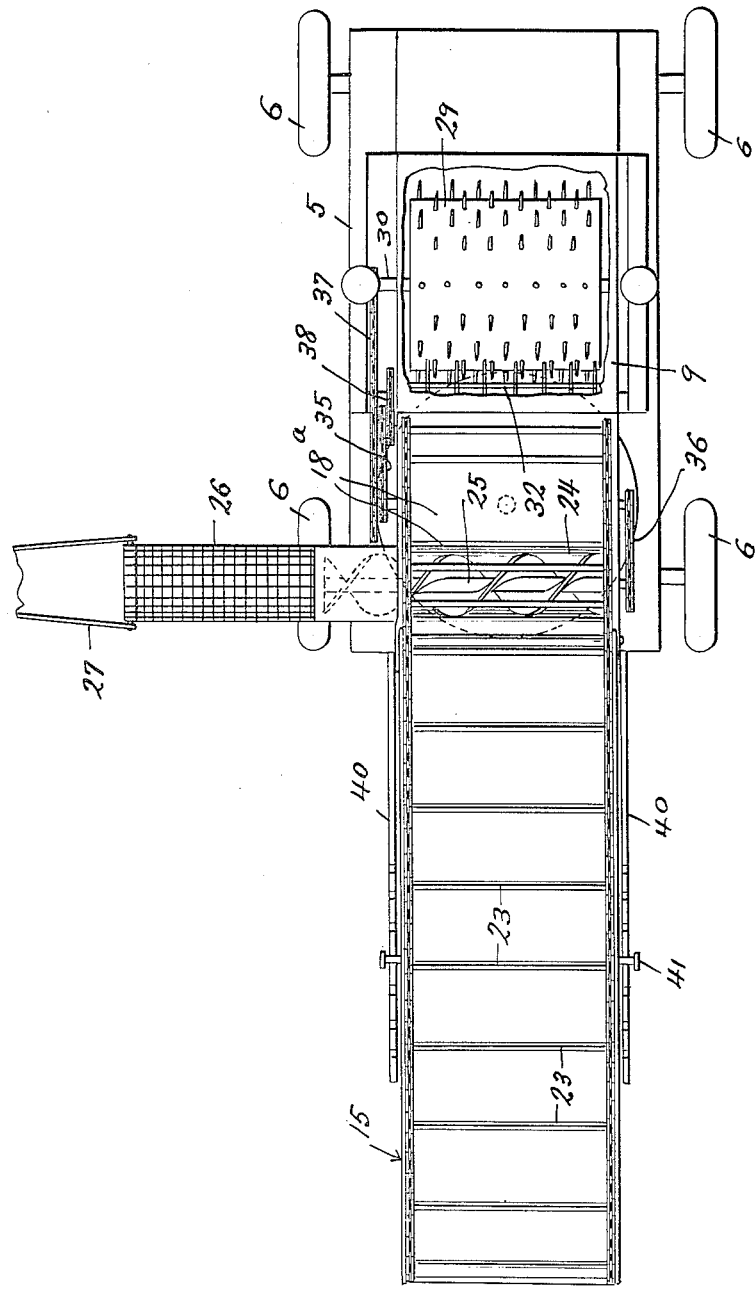
Figure 3 is a top plan view with certain parts broken away.

Mounted in the frame 8 at the upper end of the endless conveyor 15 is a transversely disposed trough 24 in which operates a screw conveyor 25. The trough 24 as well as the conveyor 25 is extended laterally beyond one side of the frame 8 as best shown in Figure 3, and at its extended end the trough 24 has secured thereto one end of the cylinder 26. Connected to the free end of the cylinder 26 is a trough or chute 27.

The housing 9 is provided with a concave bottom 28 and mounted in the housing is a toothed cylinder 29. The shaft 30 for the cylinder 29 has its ends journaled in slide bearings 31 provided externally of and at opposite sides of the housing 9.

In the housing 9 adjacent the opening 22 is a toothed beater wheel 32.

Suitably mounted in the frame 8 is a motor or engine 33 and the latter is used for driving the endless conveyor 15, the screw conveyor 25, the cylinder 29 and the beater wheel 32. Thus power from the shaft of the motor 33 is transmitted to the shaft 20 of the endless conveyor for driving the latter through the means of chain and sprocket mechanism 35. Other chain and sprocket mechanism 36 is provided for driving the conveyor 25 from the engine while chain and sprocket mechanism 37 is provided for driving the cylinder 29, and chain and sprocket mechanism 38 is provided for driving the beater wheel 32.

For supporting the conveyor 16 at the desired angle and inclination, there are provided arms or bars 39 that extend forwardly from opposite sides of the frame 8 and these bars are provided with notches 40 to receive the ends of a rod 41 upon which an intermediate portion of the endless conveyor 15 rests as shown in Figure 2. Obviously, the endless conveyor may be supported at the desired angle by placing the rod 41 in selected notches 40.

When used for gathering, beating and piling compost or manure there is placed in the machine between the upper horizontally disposed runs of conveyor 15 a platform 18a that is composed of two sections. With the second section of platform 18a in place it will cover trough 24 and form a substantial continuance of the false bottom 18. Thus it will be seen that the compost or manure is placed on the lower end of the conveyor and carried thereby to the upper end of the conveyor where the material is worked upon by the beater wheel 32 as the material discharges onto the revolving cylinder 29.

Cylinder 29 revolves at a rate of speed that will tend to throw the compost out of the casing 9 rearwardly from the machine and the material thus thrown from the machine will pile up a distance away from the rear end of the machine. Thus by moving the machine from place to place the compost or manure is gathered, beaten and piled at intervals.

When the machine is used for screening dirt for use in preparing mushroom beds or the like, the second mentioned section of platform 18a is removed. Thus the dirt and rock carried up by conveyor 15 will, instead of passing onto platform 18a, fall into trough 24. The conveyor 25 in the trough will feed the dirt, rock, etc. to the screening cylinder 26. Obviously the fine dirt will sift through the screen of the cylinder to pile up at the side of the machine, while the larger rock, etc. will pass from the screen cylinder at the lower end thereof onto the chute 27 to be discharged therefrom in a pile farther away from the side of the machine and at a distance remote from the pile of fine sifted dirt.

It will also be understood that the entire device on the turn table 7 may be swung in either direction so that the material scattered over a wide area may be worked upon without requiring a constant moving of the device from place to place.

Having thus described the invention, what is claimed as new is:

1. In a material handling machine, a wheeled truck, a turn table mounted on said truck, a frame structure mounted on the turn table to turn therewith, an endless conveyor pivotally mounted at one end to said frame structure at an end of the latter, a housing mounted on the frame structure remote from the pivoted end of the conveyor and having at the side thereof facing the conveyor an opening for receiving material from said conveyor disintegrater mechanism mounted in said housing for operating on the material received in the housing and for forcing the disintegrated material outwardly through the housing at one side of the latter, said housing at said one side being provided with a pair of complemental horizontally swinging doors and an upper vertically swinging door adapted to swing downwardly into overlapping relation with the first mentioned doors when the latter are in closed position, and means connected with the vertically swinging door and the top of the housing for securing said vertically swinging door in open position and out of the path of movement of the vertically swinging door.

2. In a material handling machine, a wheeled truck, a turn table mounted on said truck, a frame structure mounted on the turn table to turn therewith, an endless conveyor pivotally mounted on one end to said frame structure at an end of the latter, a housing mounted on the frame structure remote from the pivoted end of the conveyor and having at the side thereof facing the conveyor an opening for receiving material from said conveyor disintegrater mechanism mounted in said housing for operating on the material received in the housing and for forcing the disintegrated material outwardly through the housing at one side of the latter, said housing at said one side being provided with a pair of complemental horizontally swinging doors and an upper vertically swinging door adapted to swing downwardly into overlapping relation with the first mentioned doors when the latter are in closed position, means connected with the vertically swinging door and the top of the housing for securing said vertically swinging door in open position and out of the path of movement of the vertically swinging door, driving mechanism mounted on the frame structure for driving said conveyor and the disintegrater mechanism, and means for supporting said conveyor at the desired position of angular adjustment.

SCOTT WILSON.